United States Patent
Pan et al.

(10) Patent No.: US 8,797,229 B2
(45) Date of Patent: Aug. 5, 2014

(54) REMOTE RADIO UNIT

(75) Inventors: Weiming Pan, Shenzhen (CN);
Qingchun Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 391 days.

(21) Appl. No.: 13/258,132

(22) PCT Filed: Jun. 3, 2010

(86) PCT No.: PCT/CN2010/073528
§ 371 (c)(1),
(2), (4) Date: Mar. 22, 2012

(87) PCT Pub. No.: WO2010/145461
PCT Pub. Date: Dec. 23, 2010

(65) Prior Publication Data
US 2012/0206885 A1 Aug. 16, 2012

(30) Foreign Application Priority Data

Oct. 14, 2009 (CN) .......................... 2009 1 0179833

(51) Int. Cl.
*H01Q 1/12* (2006.01)
*H04B 1/38* (2006.01)
*H04W 88/08* (2009.01)
*H04W 28/04* (2009.01)

(52) U.S. Cl.
CPC ............... *H04B 1/38* (2013.01); *H04W 88/085* (2013.01); *H04W 28/04* (2013.01)
USPC .......................................... 343/890; 343/892

(58) Field of Classification Search
USPC .......................................... 343/878, 890, 892
See application file for complete search history.

(56) References Cited

U.S. PATENT DOCUMENTS

| | | | | |
|---|---|---|---|---|
| 6,188,373 | B1 * | 2/2001 | Martek | 343/893 |
| 6,268,828 | B1 * | 7/2001 | Martek | 342/373 |
| 6,421,021 | B1 * | 7/2002 | Rupp et al. | 343/753 |
| 6,999,042 | B2 * | 2/2006 | Dearnley et al. | 343/890 |
| 2005/0007295 | A1 * | 1/2005 | Janoschka et al. | 343/890 |

FOREIGN PATENT DOCUMENTS

| | | |
|---|---|---|
| CN | 1452349 A | 10/2003 |
| CN | 201238386 Y | 5/2009 |
| CN | 201247823 Y | 5/2009 |
| CN | 201467115 U | 5/2010 |
| JP | 2004112122 A | 4/2004 |

OTHER PUBLICATIONS

International Search Report in international application No. PCT/CN2010/073528, mailed on Sep. 16, 2010.
English Translation of the Written Opinion of the International Search Authority in international application No. PCT/CN2010/073528, mailed on Sep. 16, 2010.

* cited by examiner

*Primary Examiner* — Tan Ho
(74) *Attorney, Agent, or Firm* — Oppedahl Patent Law Firm LLC

(57) ABSTRACT

The disclosure discloses a remote radio unit, which comprises: a common slot, an antenna and a plurality of function modules; wherein the common slot is connected with the antenna and comprises a plurality of slots, and each function module is inserted in a different slot of the common slot respectively. The disclosure can solve the problem that a remote radio unit is extended inconveniently while adding frequency bands and the whole remote radio unit will be greatly affected in most cases when a fault occurs in the module supporting one frequency band.

24 Claims, 3 Drawing Sheets

REMOTE RADIO UNIT

TECHNICAL FIELD

The disclosure relates to the field of communications, particularly to a Remote Radio Unit (RRU).

BACKGROUND

In a mobile communication system, a distributed NodeB applies the design of an open framework, and the NodeB comprises a Base Band Unit (BBU) and an RRU. The BBU realizes functions such as control management, baseband processing, IUB interface and the like; wherein the IUB interface is an interface between a Radio Network Controller (RNC) and a NodeB, and a large number of macrocell NodeBs are placed in an obtainable central computer room by the BBU in a centralized manner and a baseband part is processed in a centralized way; and the RRU integrates radio frequency-related functions such as an power amplifier, a transceiver, a diplexer and the like. The BBU and the RRU are connected through an optical fiber. Due to relatively-low engineering requirements, flexible installation modes and excellent coverage performance, this new networking solution has attracted more and more operators.

Regarding a multiband (multi-standard) RRU system, a processing method in related technologies is to place modules supporting different frequency bands (different standards) in the interior of one RRU in a centralized manner or simply divide the RRU into active parts and passive parts.

In related technologies, an RRU is extended inconveniently while adding frequency bands, and the whole RRU has to be replaced. In the prior art, modules working in different frequency bands (different standards) share one cavity, where there are higher requirements for inter-modulation, stray and isolation. Modules supporting different frequency bands (different standards) are placed in the interior of one RRU in a centralized manner in the prior art, which will result in influence to each other when a module supporting one frequency band (standard) needs to be replaced or repaired because of failure, and the mean time without failures will decrease exponentially.

Currently, there is no effective solution for the problem that an RRU is extended inconveniently while adding frequency bands and the whole RRU will be greatly affected in most cases when a fault occurs in a module supporting one frequency band in related technologies.

SUMMARY

The disclosure is provided to solve the problem that an RRU is extended inconveniently while adding frequency bands and the whole RRU will be greatly affected in most cases when a fault occurs in a module supporting one frequency band. Therefore, the main purpose of the disclosure is to provide an RRU to solve the aforementioned problem.

The technical solution of the disclosure is realized by as follows.

An RRU comprises: a common slot, an antenna and a plurality of function modules, wherein the common slot is connected with the antenna and comprises a plurality of slots, and each function module is inserted in a different slot of the common slot respectively.

The RRU may further comprise a holding pole; wherein the common slot is fixed on the holding pole, an upper side of the antenna is fixed on the common slot to regulate a declination angle of the antenna, and a lower end of the antenna is fixed on the holding pole.

Each function module may be corresponding to a different slot of the common slot.

The common slot and the antenna may be located at different sides of the holding pole.

The common slot and the antenna may be connected by closely clinging to each other.

The RRU may further comprise: power amplifier tubes, which is arranged in the function modules.

The RRU may further comprise: a cavity filter, which is arranged in the common slot.

Two sides of the power amplifier tubes may be clung to inner cavity walls of the function modules closely.

Sub-RRUs working in different frequency bands or different standards may be respectively arranged in different function modules.

A slot opening may be reserved on the common slot.

Through the disclosure, in which the RRU comprises a common slot, an antenna and a plurality of function modules, wherein the common slot is connected with the antenna and comprises a plurality of slots, and each function module is inserted in a different slot of the common slot respectively, the problem that an RRU is extended inconveniently while adding frequency bands and the whole RRU will be greatly affected in most cases when a fault occurs in a module supporting one frequency band is solved so that each function module can be separately repaired, upgraded and replaced, and the costs of network construction, repair and upgrading can be reduced.

DETAILED DESCRIPTION

Function Summary

In view of the problem that a Remote Radio Unit (RRU) is extended inconveniently while adding frequency bands and the whole RRU will be greatly affected in most cases when a fault occurs in a module supporting one frequency band, an embodiment of the disclosure provides an RRU.

The RRU of the disclosure comprises: a common slot, an antenna and a plurality of function modules; wherein the common slot is connected with the antenna and comprises a plurality of slots, and each function module is inserted in a different slot of the common slot respectively.

It should be explained that, embodiments and characteristics thereof in the subject application can be mutually combined in the case of no conflicts. The disclosure will be described based on the embodiments in combination with the drawings hereinafter.

According to embodiments of the disclosure, an RRU is provided.

"NodeB" in Time Division-Synchronous Code Division Multiple Access (TD-SCDMA) network architecture of 3GPP protocol refers to the BBU and the RRU mentioned in the disclosure; and the BBU and the RRU mentioned in the disclosure can also serve as the "eNB" in Long-Term Evolution (LTE) network architecture. The is position of the RRU in other protocols (e.g., WCDMA, CDMA2000 etc.) can be deduced by analogy.

Figure 1:
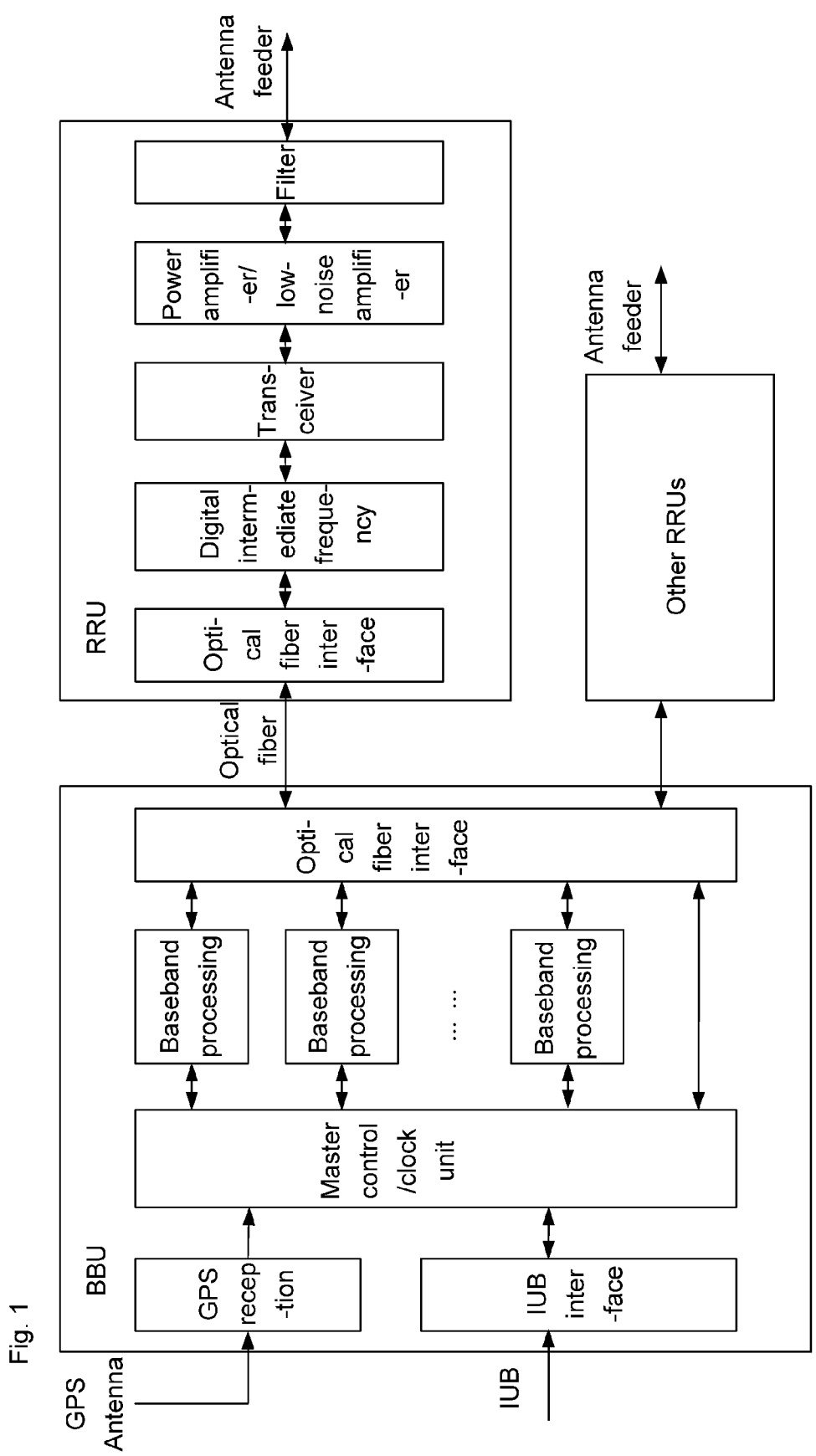
FIG. 1 shows a schematic diagram of a NodeB comprised of a BBU and an RRU according to an embodiment of the disclosure.

FIG. 1 shows a schematic diagram of a NodeB comprised of a BBU and an RRU according to an embodiment of the disclosure.

The structural schematic diagram of a NodeB comprised of a BBU and an RRU is as shown in FIG. 1, wherein the RRU comprises but is not limited to an optical fiber interface, a digital intermediate frequency, a transceiver, a power amplifier/low-noise amplifier, a filter and the like. The RRU is connected with the BBU through the optical fiber.

Figure 2:
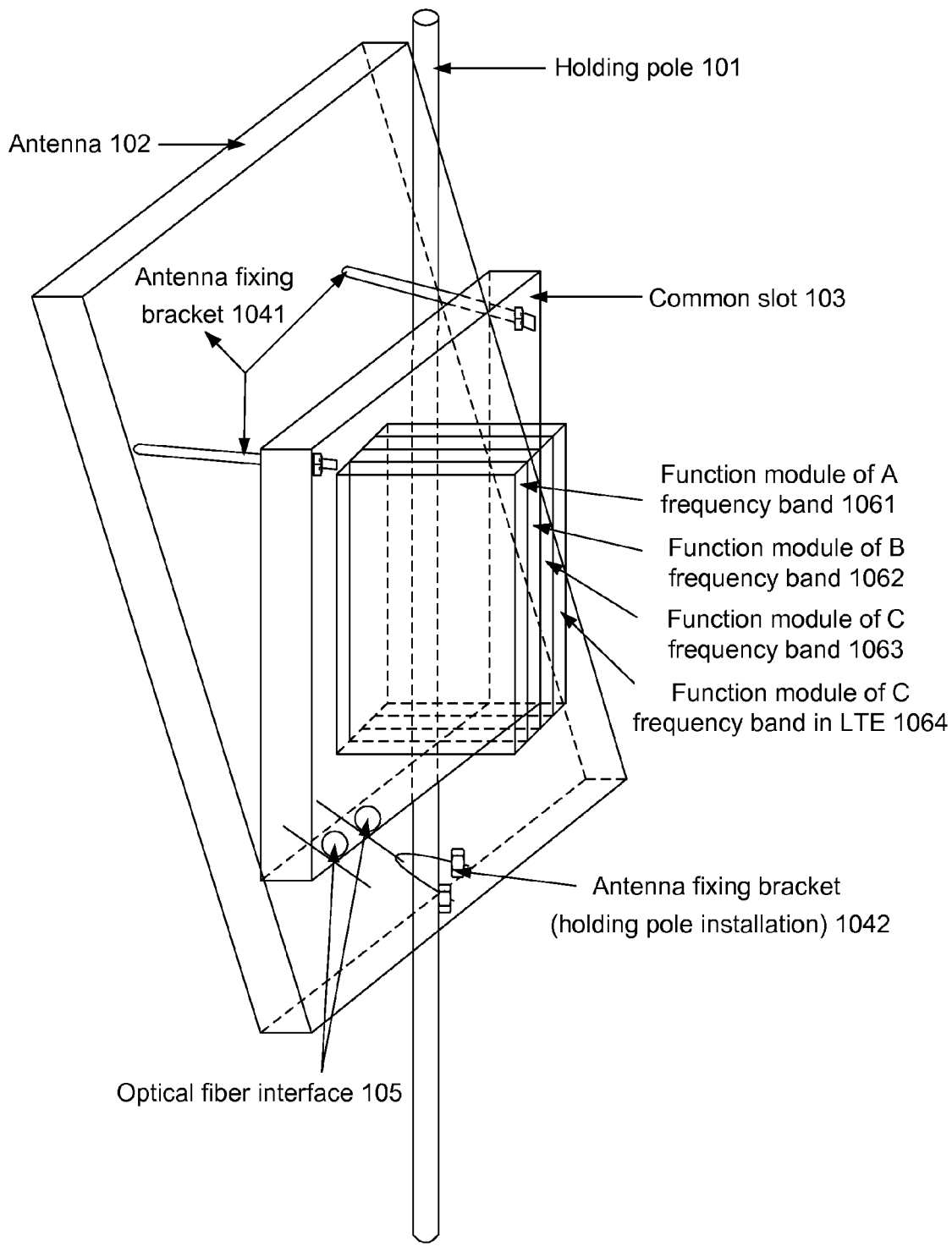
FIG. 2 shows a schematic diagram of a Remote Radio Unit (RRU) according to an embodiment of the disclosure.

FIG. 2 shows a schematic diagram of an RRU according to an embodiment of the disclosure.

Figure 3:
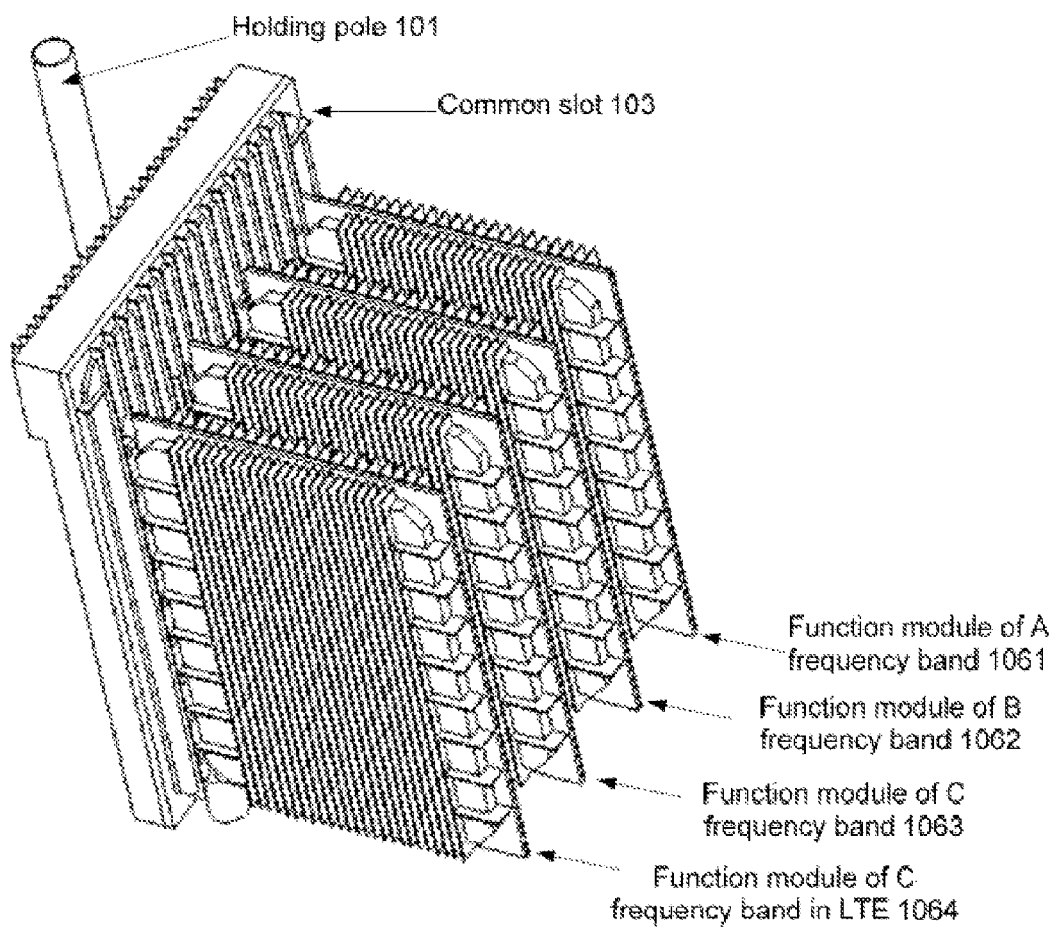
FIG. 3 shows a stereoscopic schematic diagram of an RRU according to an embodiment of the disclosure (an antenna is not shown).

FIG. 3 shows a stereoscopic schematic diagram of an RRU according to an embodiment of the disclosure (an antenna is not shown).

As shown in FIG. 2 and FIG. 3, the upper side of an antenna 102 is fixed on a common slot 103 to regulate the declination angle of the antenna 102, and the lower end of the antenna 102 is fixed on a holding pole 101 so that the common slot 103 will not bear a much larger force; the common slot 103 is installed at the other side of the antenna 102 on the holding pole 101 so that the common slot 103 and the antenna 102 are located at different sides of the holding pole, and such installation way facilitates the installation and disassembly of function modules (1061, 1062, 1063, 1064 . . . ) on one hand and makes full use of the surface area of the common slot 103 on the other hand to be inserted more modules; further, the common slot 103 and the antenna 102 are located at different sides, which can balance the gravity of the whole system and lower requirements to the holding pole. An optical fiber interface 105 can be installed on the common slot 103, or be installed on each function module (1061, 1062, 1063, 1064 . . . ) in accordance with requirements.

Another connection method between the common slot 103 and the antenna 102 is that: they can be connected by clinging to each other back to back.

If the antenna 102 has been defined by an operator, it will make it difficult to butt and waterproof the common slot 103 and the antenna 102; however, a small Printed Circuit Board (PCB) can be manufactured with a plug-in thereon corresponding to the antenna 102 to form an interface component, and the interface component is connected with the opening of the combiner of the common slot 103 through flexible cables (e.g. 9 cables), which facilitates the regulation of the declination angle since this is a flexible connection.

Multiple power amplifier cavities (or one cavity) can be manufactured in the interior of the function module 1061 having multiple power amplifiers. Since the power amplifiers are arranged up and down, the heat of the upper power amplifiers can be higher than that of the lower power amplifiers; however, since the power amplifiers dissipate heat from both sides, separate cavities can be manufactured in the power amplifiers to avoid air convection up and down.

The common slot 103 in the RRU of the disclosure comprises but is limited to an optical interface, cavity filters of all frequency bands (all standards), a combiner, a power source, a lightning arrester and the like. Each function module is a sub-RRU system, comprising but being limited to a digital system, a transceiver, a power amplifier, a distributed power source and the like. The interfaces between the function modules and the common slot 103 can be standardized. The antenna 102 is connected with the common slot 103, the common slot 103 is in butt joint with the function modules, and each function module is inserted into the corresponding slot of the common slot 103 according to the corresponding relation between each function module and each slot of the common slot 103.

Preferably, in the disclosure, the upper side of the antenna 102 is fixed on the common slot 103 through an antenna fixing bracket 1041 to regulate the declination angle of the antenna 102, and the lower end of the antenna 102 is fixed on the holding pole 101 through the antenna fixing bracket 1042 so that the common slot 103 will not bear a much large force.

Preferably, in the disclosure, the common slot 103 is installed at the other side of the antenna 102 on the holding pole 101, which facilitates the installation and disassembly of the function modules on one hand and makes full use of the surface area of the common slot 103 on the other hand to insert more function modules; further, the common slot 103 and the antenna 102 are arranged at different sides, which can balance the gravity of the whole system and lower requirements to the holding pole 101.

Preferably, in the disclosure, the standard interface direction is defined to decouple all parts, which is a good support to forward compatibility and evolution of successive technologies, for example, if there is an improvement to the common slot 103, it only needs to modify the common slot 103 without any influence to other parts.

Preferably, in the disclosure, because of the higher and higher integration level of future function modules, rapidly-increased processing capability of Field Programmable Gate Array (FPGA), intermediate-frequency Analog to Digital Converter (ADC), integration level of Digital to Analog Converter (DAC), integration of the radio frequency devices and new power amplifier technologies, the size of the function modules will be smaller and smaller; however, the function modules are expected to dissipate heat from both sides in view of heat dissipation, and such requirement can be exactly satisfied by the present architecture.

Preferably, in the disclosure, the function modules are divided from left to right, and can be arranged up and down when distributing the PCB, which is more convenient and reasonable, so that the functional areas of the PCB can be divided clearly and easily and the reliability of the function modules is increased.

Preferably, in the disclosure, the power amplifiers are arranged in the function modules, that is, the power amplifiers and the function modules are integrated in cavities. Since the power amplifiers and the function modules have little influence to each other, the cost is also small.

Preferably, in the disclosure, cavity filers are arranged in the common slot 103, that is, the filter cavities applying different frequency bands or different standards are integrated to save space. Since the filter cavities have little influence to each other, the cost is also small.

Preferably, in the disclosure, some special tools (e.g., a flashlight tool and swaging tool etc.) can be manufactured on the common slot 103, which is low in cost and can greatly improve work efficiency.

The RRU of the disclosure is located in the distributed NodeB (a BBU and an RRU) system, during the working process, the RRU performs transmission of the service data and operation commands with the BBU through optical fibers, and performs reception and transmission of radio frequency signals with the antenna through interfaces or cables. The common slot can be designed according to requirements with respect to frequency bands, standards, upgrading, evolution and the like. After the interface standard is formulated, each function module can be separately repaired, upgraded and changed, which brings about strong flexibility and can reduce the costs of network construction, repair and upgrading.

The technical problem to be solved by the disclosure is the architecture of RRUs in a multiband and multi-standard mobile communication system. By means of the disclosure, the standard interface of the RRU common slot can be defined to realize independent development of the common slot and the modules of all frequency bands (all standards), which provides a good support for forward compatibility and evolution of successive technologies and is good for cost reduction, design, installation, maintenance and upgrading.

It can be seen from the aforementioned description that, the disclosure achieves the following technical effects.

A. The common slot and all function modules applies the separated type architecture, which enables a slot opening to be reserved on the common slot and facilities extension.

B. Requirements for the design technology are greatly lowered, for example, a sub-RRU system A working in different frequency bands (different standards) is an independent function module A, a sub-RRU system B is an independent function module B, and different function modules are different independent cavities. If the sub-RRU system A and the sub-RRU system B share one cavity, requirements for inter-modulation, spuriousness and isolation will be higher. Actually, the sub-RRU system A and the sub-RRU system B in the disclosure are located in different cavities, which avoids influence to each other or has little influence to each other, thus bringing about great benefit for technical design.

C. It's more beneficial to research and development, and all parts are independent to each other through the standard interface, which facilitates independent management of the blocks and accelerates research and development.

D. It is conveniently and reasonably installed and easily replaced and repaired on site, for example, if function module A has a problem, it only needs to take down the function module A without influencing the work of the function modules B and C. If the function module A and the function module B are integrated, the function module A and the function module B will influence each other and the mean time withouts failures will at least decrease exponentially.

E. The structures of the function modules more facilitate heat dissipation of the power amplifiers in the modules; besides the lower side of the power amplifier tubes, which can perform heat dissipation through the copper or aluminum substrate, the upper side of the power amplifier tubes can be led onto the shield box of the power amplifier, in addition, the two sides of the power amplifier tubes are close clung to the wall of the inner cavity of the RRU so that the power amplifiers can dissipate heat from two sides.

Apparently, those skilled in the art should understand that, all aforementioned modules or steps of the disclosure can be realized by a general computing device, and they can be centralized on a single computing device or distributed on a network comprised by multiple computing devices; preferably, they are realized by the executable program codes of the computing device so that they can be stored in a memory device to be executed by the computing device, or they can be manufactured into integrated circuit modules, or they can be realized by manufacturing multiple modules or steps of them into a single integrated circuit module. In such a way, the disclosure is not limited to any specific combination of hardware or software.

The above are only preferred embodiments of the disclosure and are not limited to the disclosure, and for those skilled in the art, there may be various modifications and changes to the disclosure. Any modification, equivalent replacement and improvement made within the spirit and principle of the disclosure should be included in the protection scope of the disclosure.

What is claimed is:

1. A Remote Radio Unit (RRU), comprising: a common slot, an antenna and a plurality of function modules; wherein the common slot is connected with the antenna and comprises a plurality of slots, and each function module is inserted in a different slot of the common slot respectively.

2. The RRU according to claim 1, further comprising: a holding pole; wherein the common slot is fixed on the holding pole, an upper side of the antenna is fixed on the common slot to regulate a declination angle of the antenna, and a lower end of the antenna is fixed on the holding pole.

3. The RRU according to claim 2, wherein the common slot and the antenna are located at different sides of the holding pole.

4. The RRU according to claim 3, wherein sub-RRUs working in different frequency bands or different standards are respectively arranged in different function modules.

5. The RRU according to claim 3, wherein a slot opening is reserved on the common slot.

6. The RRU according to claim 2, wherein sub-RRUs working in different frequency bands or different standards are respectively arranged in different function modules.

7. The RRU according to claim 2, wherein a slot opening is reserved on the common slot.

8. The RRU according to claim 1, wherein each function module is corresponding to a different slot of the common slot.

9. The RRU according to claim 8, wherein sub-RRUs working in different frequency bands or different standards are respectively arranged in different function modules.

10. The RRU according to claim 8, wherein a slot opening is reserved on the common slot.

11. The RRU according to claim 1, wherein the common slot and the antenna are connected by closely clinging to each other.

12. The RRU according to claim 11, wherein sub-RRUs working in different frequency bands or different standards are respectively arranged in different function modules.

13. The RRU according to claim 11, wherein a slot opening is reserved on the common slot.

14. The RRU according to claim 1, further comprising: power amplifier tubes, arranged in the function modules.

15. The RRU according to claim 14, wherein two sides of the power amplifier tubes are clung to inner cavity walls of the function modules closely.

16. The RRU according to claim 15, wherein sub-RRUs working in different frequency bands or different standards are respectively arranged in different function modules.

17. The RRU according to claim 15, wherein a slot opening is reserved on the common slot.

18. The RRU according to claim 14, wherein sub-RRUs working in different frequency bands or different standards are respectively arranged in different function modules.

19. The RRU according to claim 14, wherein a slot opening is reserved on the common slot.

20. The RRU according to claim 1, further comprising: a cavity filter, arranged in the common slot.

21. The RRU according to claim 20, wherein sub-RRUs working in different frequency bands or different standards are respectively arranged in different function modules.

22. The RRU according to claim 20, wherein a slot opening is reserved on the common slot.

23. The RRU according to claim 1, wherein sub-RRUs working in different frequency bands or different standards are respectively arranged in different function modules.

24. The RRU according to claim 1, wherein a slot opening is reserved on the common slot.

* * * * *